E. HELLER.
ROPE CLAMP.
APPLICATION FILED APR. 14, 1916.
1,207,401. Patented Dec. 5, 1916.
Fig. 1,
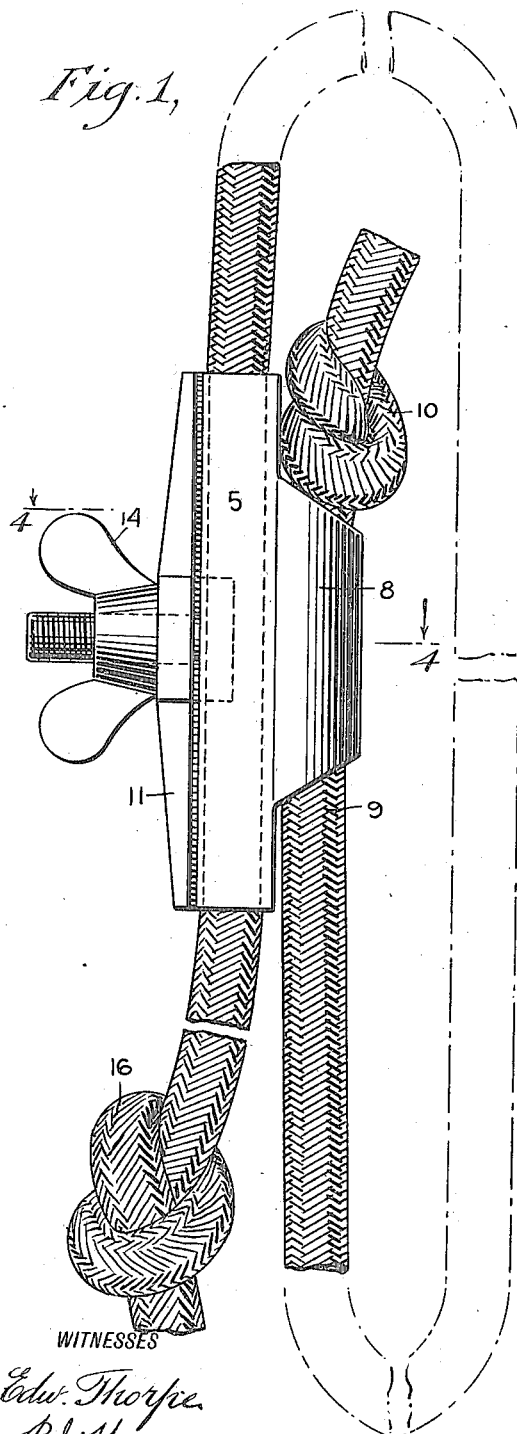
Fig. 2, 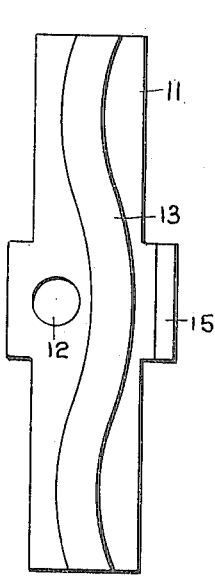
Fig. 3, 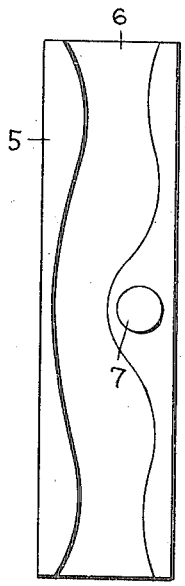
Fig. 4, 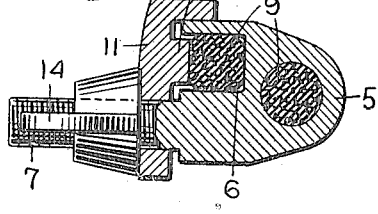
WITNESSES
Edw. Thorpe
B. Joff
INVENTOR
E. Heller
BY Munn & Co.
ATTORNEYS

UNITED STATES PATENT OFFICE.

EDWARD HELLER, OF NORTH BERGEN, NEW JERSEY.

ROPE-CLAMP.

1,207,401.

Specification of Letters Patent.

Patented Dec. 5, 1916.

Application filed April 14, 1916. Serial No. 91,059.

*To all whom it may concern:*

Be it known that I, EDWARD HELLER, a citizen of the United States, and a resident of North Bergen, Woodcliff-on-Hudson, in the county of Hudson and State of New Jersey, have invented a new and Improved Rope-Clamp, of which the following is a full, clear, and exact description.

My invention relates to a rope clamp particularly adaptable for clothes lines.

The object thereof is to provide a simple, inexpensive, and efficient clamp whereby the line can be easily slackened or tightened without any danger of the rope becoming jammed due to atmospheric conditions.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a side elevation of my clamp; Fig. 2 is a plan view on the inside of the top or wedge section; Fig. 3 is a top view on the main section; and Fig. 4 is a cross section on line 4—4, Fig. 1.

Referring to the drawings, 5 is the main section, which is preferably elongated and rectangular in shape. It has in the top thereof a longitudinal, sinuous groove 6 the width of which is minimum in the central part of the section to accommodate to one side a threaded stud 7 forming an integral part of the section. The main section has also depending from the bottom thereof a tubular socket 8 extending longitudinally for receiving a line 9, which is prevented from being pulled out of the socket by forming a knot 10 at said end of the line. The other end of the line enters easily the sinuous groove 6, for the narrowest width of the groove is wider than the diameter of the line.

To retain the line in the main section, a top or wedge section 11 is provided, which is of substantially the same length and width, having an opening 12 for the stud 7, and a sinuous-shaped projection 13 having a substantially uniform width through its entire length. The projection 13 enters the groove 6 of the main section when the top section is forced toward the main section by the winged nut 14 provided on the threaded stud. To facilitate the engagement of the projection 13 with the groove 6, the top section is provided with a side flange 15 adapted to extend along the side of the main section. The engagement of the projection 13 with the line in the groove throws the same against the walls of the groove 6 and jams therein.

When it is desired to either tighten the line or release the line, according to the atmospheric conditions, all that is necessary is to release the winged nut 14, whereby the pressure on the line is released. If the length of the line is to be increased, the wing is released sufficiently to allow the weight of the line to draw it in the groove 6. The line is prevented from being pulled out of the groove by forming a knot 16. If it is desired to tighten the line, all that is necessary is to pull on the knob 16 after the pressure on the line has been released. After pulling a sufficient length of line through the groove, the line may be jammed in the groove by simply screwing the knot 14 to force the top section toward the main section.

I claim:

In a clothes-line clamp, a main section having a sinuous, longitudinal groove in the top thereof for receiving a line, the width of said groove increasing from the middle toward the end of the section, a threaded stud rising from the middle of the main section at one side of the groove, a top section having an aperture for engaging the stud, a sinuous projection of substantially uniform width on said top section for entering the sinuous groove, a flange depending from the top section to engage the side of the main section to maintain the sinuous projection in a predetermined position within the sinuous groove, and a tubular socket depending from the main section longitudinally of said section.

EDWARD HELLER.

Witnesses:
 FERDINAND BORCHERT,
 AUGUST CHAS. SELFURTH.

Copies of this patent may be obtained for five cents each, by addressing the "Commissioner of Patents, Washington, D. C."